(12) United States Patent
Harris

(10) Patent No.: US 10,826,887 B2
(45) Date of Patent: Nov. 3, 2020

(54) PASSWORD MAINTENANCE IN COMPUTER NETWORKS

(71) Applicant: Osirium Limited, Berkshire (GB)

(72) Inventor: Andrew Steven Harris, Berkshire (GB)

(73) Assignee: Osirium Limited, Berkshire (GB)

( * ) Notice: Subject to any disclaimer, the term of this patent is extended or adjusted under 35 U.S.C. 154(b) by 208 days.

(21) Appl. No.: 16/069,502

(22) PCT Filed: Jan. 10, 2017

(86) PCT No.: PCT/GB2017/050042
§ 371 (c)(1),
(2) Date: Jul. 11, 2018

(87) PCT Pub. No.: WO2017/121992
PCT Pub. Date: Jul. 20, 2017

(65) Prior Publication Data
US 2019/0028463 A1    Jan. 24, 2019

(30) Foreign Application Priority Data
Jan. 11, 2016 (GB) .................................. 1600449.1

(51) Int. Cl.
*H04L 29/06* (2006.01)
*G06F 21/41* (2013.01)

(52) U.S. Cl.
CPC .......... *H04L 63/0815* (2013.01); *G06F 21/41* (2013.01); *H04L 63/083* (2013.01);
(Continued)

(58) Field of Classification Search
CPC .................. H04L 63/0815; H04L 63/0892
(Continued)

(56) References Cited

U.S. PATENT DOCUMENTS 7,865,950 B2 * 1/2011 Lipetz ................. G06F 21/6218
713/182
2004/0260953 A1 12/2004 Jamieson et al.
(Continued)

FOREIGN PATENT DOCUMENTS

| WO | WO2005022367 | 3/2005 |
| WO | WO2007068715 | 6/2007 |
| WO | WO2011023456 | 3/2011 |

OTHER PUBLICATIONS

GB Search Report for corresponding GB Patent Application No. GB1600449.1 dated Jun. 23, 2016, 3 pages.
(Continued)

*Primary Examiner* — Longbit Chai
(74) *Attorney, Agent, or Firm* — Lee & Hayes, P.C.

(57) ABSTRACT

An apparatus for providing controlled access to a plurality of devices in a computer network (104), wherein the plurality of devices are accessible by users external to the computer network (102) by logging in to a privileged account, to which access is controlled by an authentication server (106); the apparatus comprises a receiver configured to receive user password data from a user requesting access to the privileged account via a device, a password determiner configured to determine account password data based on user password data, and to control a transmitter to transmit to the device account password data for allowing the user to access the privileged account, the receiver also configured to receive a request from the device to update account password data, and a password manager configured to update account password data and store updated account password data associated with the privileged account.

13 Claims, 3 Drawing Sheets

(52) U.S. Cl.
CPC ........ *H04L 63/0892* (2013.01); *H04L 63/102* (2013.01); *H04L 63/104* (2013.01)

(58) Field of Classification Search
USPC .......................................................... 726/8
See application file for complete search history.

(56) References Cited

U.S. PATENT DOCUMENTS

| | | |
|---|---|---|
| 2005/0015490 A1 | 1/2005 | Saare et al. |
| 2007/0242827 A1* | 10/2007 | Prafullchandra ... G06F 21/6218 380/241 |
| 2008/0033966 A1* | 2/2008 | Wahl ................... G06F 21/6218 |
| 2011/0277016 A1 | 11/2011 | Hockings et al. |
| 2015/0381593 A1 | 12/2015 | Low et al. |

OTHER PUBLICATIONS

PCT International Preliminary Report on Patentability for corresponding PCT International Application No. PCT/GB2017/050042 dated Jul. 26, 2018, 12 pages.

PCT Search Report for corresponding International Patent Application No. PCT/GB2017/050042 dated Mar. 20, 2017, 17 pages.

\* cited by examiner

PASSWORD MAINTENANCE IN COMPUTER NETWORKS

This application is a 35 U.S.C. § 371 National Stage application of PCT application PCT/GB2017/050042 filed on Jan. 10, 2017, which claims priority to GB application 1600449.1, filed on Jan. 11, 2016, both of which are incorporated herein by reference for all purposes.

TECHNICAL FIELD

The invention relates to the maintenance of passwords for devices within a computer network. In particular embodiments, the invention may relate to the maintenance of passwords in a computer network using single sign on access control for privileged users of the computer network.

BACKGROUND

Information Technology (IT) infrastructures, termed computer networks herein, may be managed by one or more privileged users that are given elevated powers to update and/or amend the computer network to ensure that uptime, performance, resources, and security of the computers in the network meet the needs of the or other owner of the computer network. The privileged users are provided with these elevated powers through privileged accounts that have been set up in the computer network and are accessed using secure log in credentials, termed passwords herein. The privileged accounts may be accessed by users external to the computer network.

The misuse of privileged accounts has become one of the most critical security challenges to owners of computer networks, as uncontrolled access to privileged accounts allows access to the computer network by untrusted third parties that can use such access to compromise data and inflict cyber-attacks on the computer network. Access by such third parties can cause irreparable damage to a business and its corporate reputation.

SUMMARY

According to the invention in an aspect, there is provided an apparatus for providing controlled access to a plurality of devices in a computer network, wherein the plurality of devices are accessible by users external to the computer network by logging into a privileged account, and wherein access to the privileged account is controlled by an authentication server, the apparatus comprising: a receiving means, which may be a receiver, configured to receive user password data from a user requesting access to the privileged account via a device; a password determining means, which may be a password determiner, configured to determine account password data based on the user password data, and configured to control a transmitter to transmit the account password data to the device, wherein the account password data is for allowing the user to access to the privileged account, and wherein the receiver is further configured to receive a request to update the account password data from the device, the apparatus further comprising a password managing means, which may be a password manager, configured to update the account password data and store the updated account password data such that it is associated with the privileged account.

Optionally, the receiver is configured to receive further user password data from a user requesting access to the privileged account, and wherein the password determiner is configured to determine the updated account password data and to control the transmitter to transmit the account password data to one of the plurality of devices.

Optionally, the user requests access to the privileged account via a further device.

Optionally, the password determiner is configured to determine the updated account password data by retrieving the stored updated account password data.

Optionally, the password manager is configured to store the updated account password data in a replica authentication server, which comprises account password data for one or more privileged accounts.

Optionally, the password manager is configured to control the transmitter to transmit the updated account password data to the replica authentication server.

Optionally, the password determiner is configured to control the transmitter to transmit a request for the updated account password data to the replica authentication server, and wherein the receiver is configured to receive the updated account password data from the replica authentication server.

Optionally, the apparatus is a single sign on system configured such that the account password data is not accessible by the user.

According to the invention in another aspect, there is provided a method for providing controlled access to a plurality of devices in a computer network, wherein the plurality of devices are accessible by users external to the computer network by logging into a privileged account, and wherein access to the privileged account is controlled by an authentication server, the method comprising: receiving, by a receiver, user password data from a user requesting access to the privileged account via a device; determining, by a password determiner, account password data based on the user password data; controlling, by the password determiner, a transmitter to transmit the account password data to the device, wherein the account password data is for allowing the user to access to the privileged account; receiving, by the receiver, a request to update the account password data from the device; updating, by a password manager, the account password data; and storing, by the password manager, the updated account access password data such that it is associated with the privileged account.

Optionally, the method further comprises the receiver receiving further user password data from a user requesting access to the privileged account; the password determiner determining the updated account password data; and the password determiner controlling the transmitter to transmit the account password data to one of the plurality of devices.

Optionally, the user requests access to the privileged account via a further device.

Optionally, the password determiner determines the updated account password data by retrieving the stored updated account password data.

Optionally, the password manager stores the updated account password data in a replica authentication server, which comprises account password data for one or more privileged accounts.

Optionally, the password manager controls the transmitter to transmit the updated account password data to the replica authentication server.

Optionally, the password determiner controls the transmitter to transmit a request for the updated account password data to the replica authentication server, and wherein the receiver is configured to receive the updated account password data from the replica authentication server.

Optionally, the apparatus is a single sign on system configured such that the account password data is not accessible by the user.

According to the invention in another aspect, there is provided a computer program comprising instructions which, when executed on at least one processor, cause the at least one processor to carry out a method disclosed herein.

According to the invention in another aspect, there is provided a carrier containing a computer program disclosed herein, wherein the carrier is one of an electronic signal, optical signal, radio signal, or non-transitory computer readable storage medium.

BRIEF DESCRIPTION OF THE FIGURES

Exemplary embodiments of the invention are disclosed herein with reference to the accompanying drawings, in which.

DETAILED DESCRIPTION

Generally, disclosed herein are methods and apparatus for controlling access to privileged accounts within a computer network. In particular, the methods and apparatus disclosed may control access to the privileged accounts by users external to the computer network. The computer network may be a plurality of networked computers owned by a particular entity or organisation and to which access is to be restricted on security grounds.

Exemplary methods and apparatus may provide access to the privileged accounts after account password data for allowing access to the privileged account has been updated, e.g. by on request from an authentication server.

An entity that is the owner of a computer network may wish to outsource certain business functions or other tasks to a second, separate entity. Such outsourcing may necessitate granting access to the computer network to one or more users of the second entity. Such access must be tightly controlled in order to maintain the integrity of the computer network against malicious attacks by other parties. Such attacks may include the theft of the entity's data and/or the introduction of malware or other computer viruses to the computer network. To control access to the computer network, a SSO system may be used.

Single sign on (SSO) access control systems may provide a degree of separation between users accessing privileged user accounts network and the devices within a computer that the users are accessing.

Figure 1:
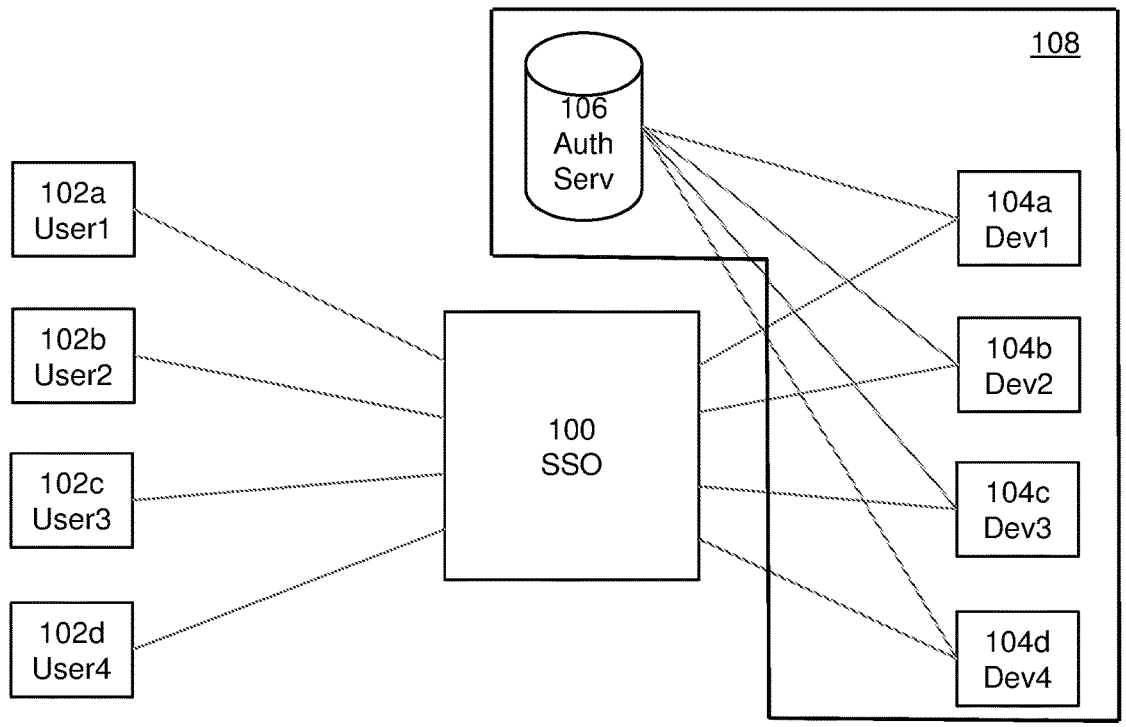
FIG. 1 is an architecture of an SSO, a plurality of users and a computer network.

FIG. 1 shows an exemplary SSO system 100, users 102a-d and computer network 108. A plurality of users 102a-d are in data communication with the SSO 100 and the SSO 100 is further in data communication with a plurality of devices 104a-d. In turn, the devices 104a-d are in data communication with an authentication server 106.

The devices 104a-d and the authentication server 106 are positioned within an organisation's computer network. Access to the devices 104a-d by the SSO 100 is permitted subject to presentation of the correct password data, but access to the authentication server 106 by the SSO 100 is not typically permitted by the owner of the network.

It is noted that the term "devices" as used herein to refer to entities within the computer network encompasses applications and resources hosted on a network entity, such as a server or database within the computer network. A device need not therefore be a physical network entity, but may be hosted within a network entity, optionally along with one or more other devices.

Users 102a-d may have access to privileged accounts within the computer network 108 via the SSO 100. Each user 102a-d has individual log in credentials comprising user password data. A user 102a-d uses the user password data to log in to the SSO 100. The SSO 100 is then able to retrieve data indicating which devices 104a-d the user 102a-d has access to and which privileges the user 102a-d has within the computer network 108. The SSO 100 logs the user into the relevant devices 104a-d using account password data known to the SSO 100 and the devices 104a-d. The account password data are not known to the user 102a-d, allowing security of the computer network 108 to be maintained. The account password data may be linked to a particular privileged account and may cover a number of devices 104a-d.

During log on of a user 102a-d to a privileged account, the SSO 100 transmits the account password data to a device 104a-d. The device 104a-d sends the account password data to the authentication server 106, which responds to the device 104a-d with the privileges for the privileged account logged onto by the user 102a-d. If the account password data is incorrect, for example because it has expired, the user is not permitted access to the devices 104a-d of the computer network.

Periodically, the authentication server 106 is configured to change the account password data relating to a privileged account. Typically, this occurs when the account password data is transmitted to the authentication server 106 by the device 104a-d. Upon receipt of the account password data, the authentication server 106 authenticates the user 102a-d, and allows access on the condition that the account password is changed. The authentication server 106 therefore requests a change to the account password data and transmits the request to the device 104a-d that transmitted the account password data to the authentication server 106. The device 104a-d transmits the request to the SSO 100, which changes the password and allows the user 102a-d to access the device 104a-d.

The changed account password data relates to a privileged account, which may cover a plurality of devices 104a-d. Therefore, the inventors have identified a problem wherein the SSO 100 is unaware that the password has changed for all devices 104a-d linked to that privileged account. When a user attempts to log on to the privileged account via a different device 104a-d than that used at the previous log on and at which the account password has changed, the SSO 100 is unaware of the password change and attempts to use the wrong account password.

Figure 2:
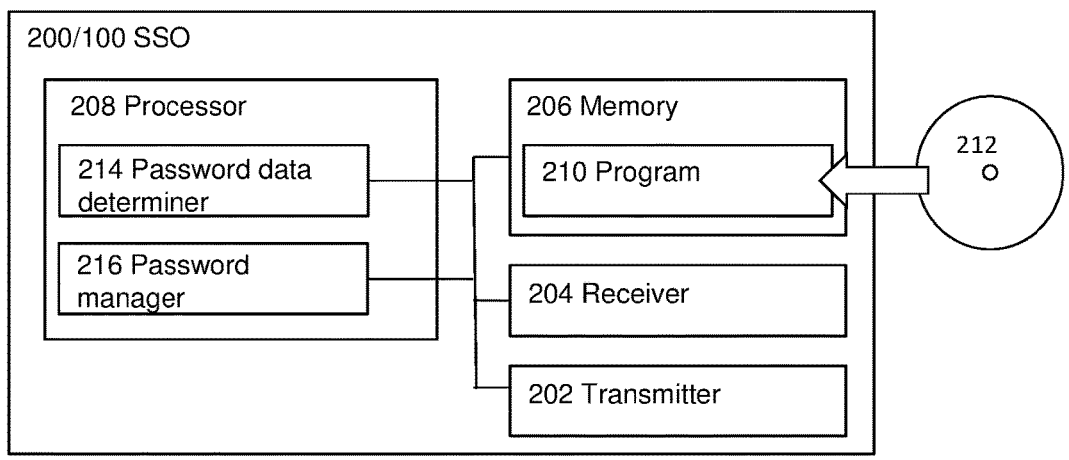
FIG. 2 is a schematic diagram of a SSO.

FIG. 2 shows a schematic representation of an apparatus 200, which may be the SSO 100 in the architecture of FIG. 1. The apparatus 200 comprises a transmitter 202 and a receiver 204. The transmitter 202 and receiver 204 may be in data communication with other network entities such as servers, databases and functions in a computer network and are configured to transmit and receive data accordingly.

The apparatus 200 further comprises a memory 206 and a processor 208. The memory 206 may comprise a non-volatile memory and/or a volatile memory. The memory 206 may have a computer program 210 stored therein. The computer program 210 may be configured to undertake the methods disclosed herein. The computer program 210 may be loaded in the memory 206 from a non-transitory computer readable medium 212, on which the computer program is stored. The processor 208 is configured to undertake one or more of the functions of a password data determiner 214 and a password manager 216, as set out below.

Each of the transmitter 202 and receiver 204, memory 206, processor 208, password data determiner 214 and password manager 216 is in data communication with the other features 202, 204, 206, 208, 210, 214, 216 of the apparatus 200. The apparatus 200 can be implemented as a combination of computer hardware and software. In particular, the password data determiner 214 and password manager 216 may be implemented as software configured to run on the processor 208. The memory 206 stores the various programs/executable files that are implemented by a processor 208, and also provides a storage unit for any required data. The programs/executable files stored in the memory 206, and implemented by the processor 208, can include the password data determiner 214 and password manager 216, but are not limited to such.

Figure 3:
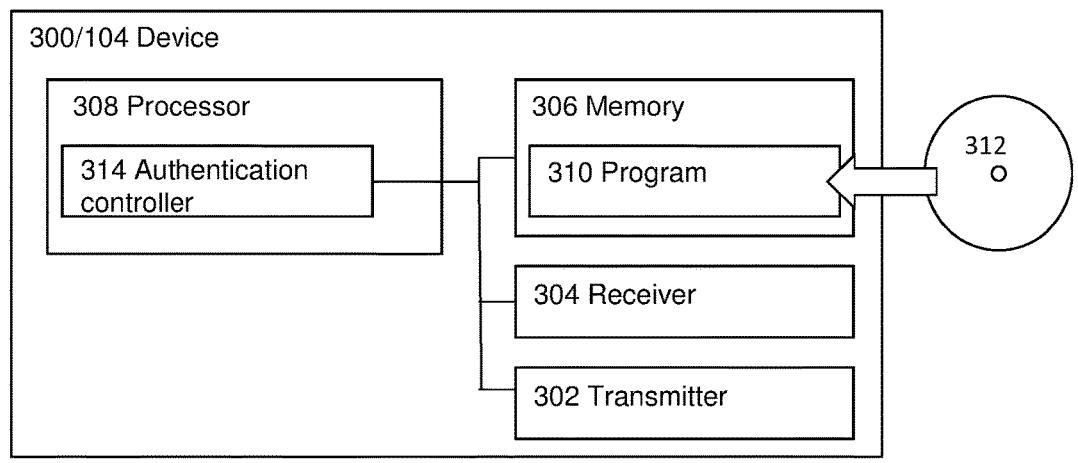
FIG. 3 is a schematic drawing of a device in a computer network.

FIG. 3 shows a schematic representation of an apparatus 300, which may be a network entity hosting one of the plurality of devices 104a-d in the architecture of FIG. 1. The apparatus 300 comprises a transmitter 302 and a receiver 304. The transmitter 302 and receiver 304 may be in data communication with other network entities such as servers, databases and functions in a computer network and are configured to transmit and receive data accordingly.

The apparatus 300 further comprises a memory 306 and a processor 308. The memory 306 may comprise a non-volatile memory and/or a volatile memory. The memory 306 may have a computer program 210 stored therein. The computer program 310 may be configured to undertake the methods disclosed herein. The computer program 310 may be loaded in the memory 306 from a non-transitory computer readable medium 312, on which the computer program is stored. The processor 308 is configured to undertake the function of an authentication controller 314, as set out below.

Each of the transmitter 302 and receiver 304, memory 306, processor 308 and authentication controller 316 is in data communication with the other features 302, 304, 306, 308, 310, 314 of the apparatus 300. The apparatus 300 can be implemented as a combination of computer hardware and software. In particular, the password data determiner 314 and password manager 316 may be implemented as software configured to run on the processor 308. The memory 306 stores the various programs/executable files that are implemented by a processor 308, and also provides a storage unit for any required data. The programs/executable files stored in the memory 306, and implemented by the processor 308, can include an authentication controller 314, but are not limited to such.

Figure 4:
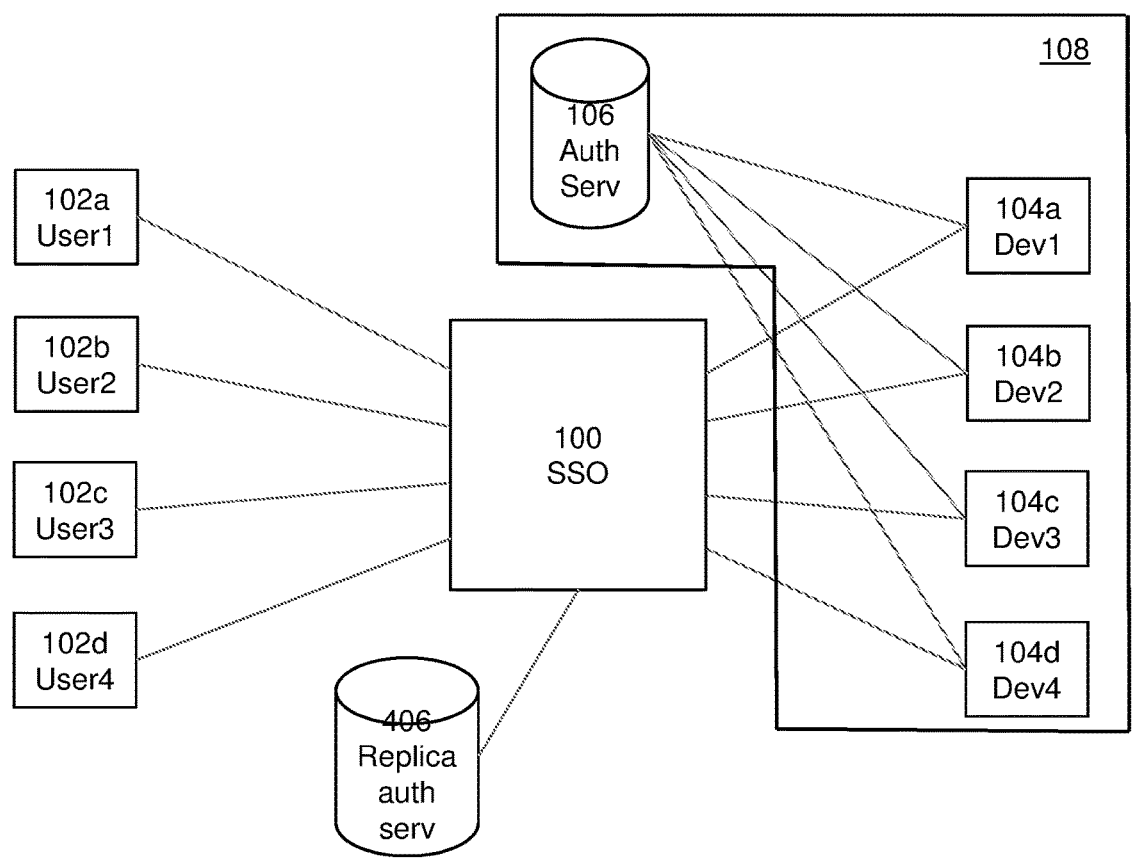
FIG. 4 is an architecture of an SSO, a plurality of users and a computer network.

FIG. 4 shows an architecture of a computer network, a plurality of users 102a-d and a SSO 100 according to exemplary methods and apparatus disclosed herein. Many of the features of FIG. 4 are similar to or the same as those in FIG. 1. The same reference numerals are used for these features as used in FIG. 1 and they are not described again here.

FIG. 4 includes a replica authentication server 406. The replica authentication server 406 is maintained by the SSO 100 and stores the account password data for the privileged accounts to be accessed by the users 102a-d. The replica authentication server 406 may be a replica of the authentication server 106, which allows the SSO the ability to access the account password data for each privileged account without having access to the authentication server 106.

The replica authentication server 406 may be a separate database or may be stored on a memory of the SSO 100.

Figure 5:
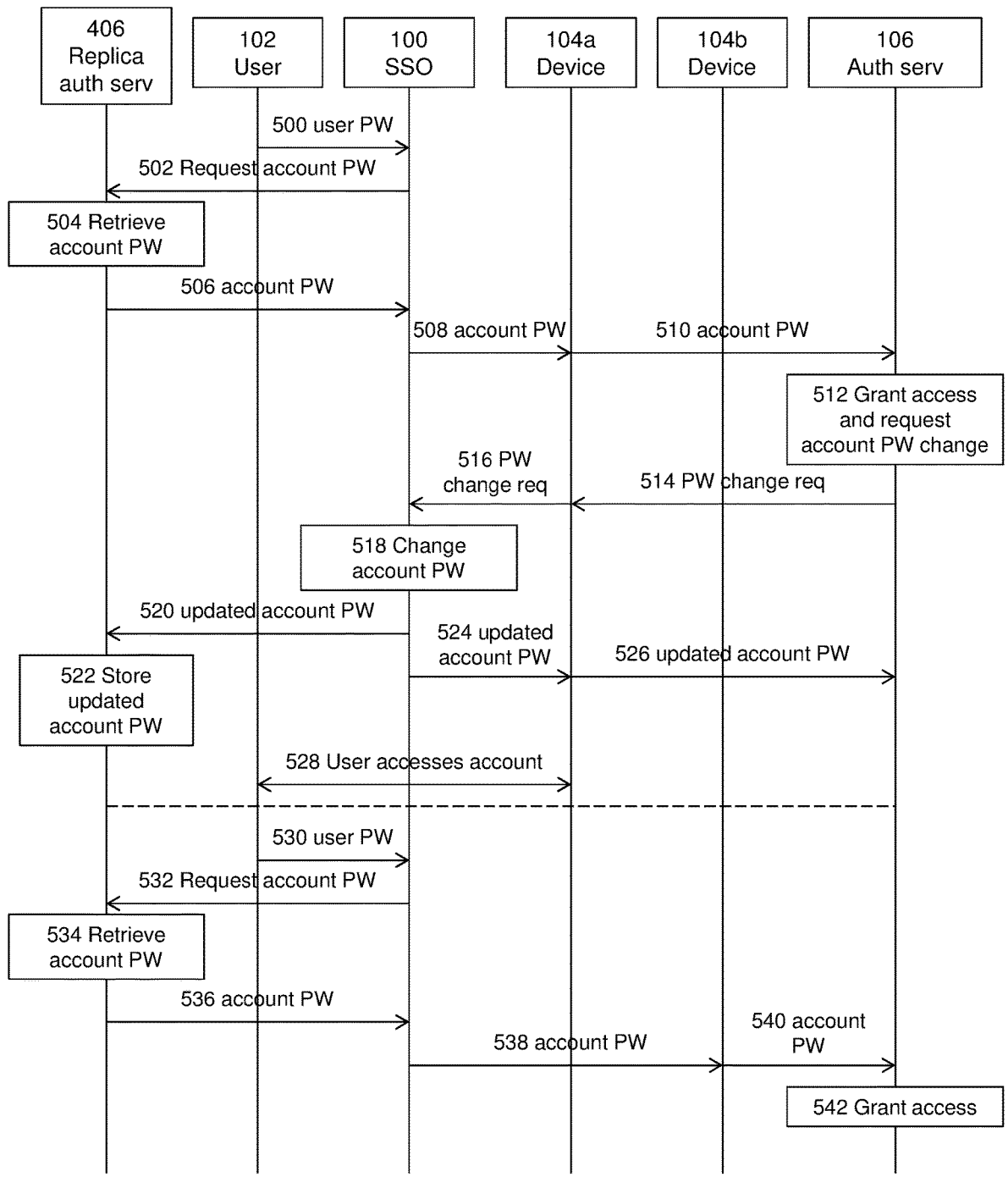
FIG. 5 is a signalling flow diagram.

FIG. 5 shows a signalling flow diagram illustrating an exemplary method.

A user 102a-d transmits 500 user password data to the SSO 100. The user password data comprises personal login credentials for the user and may comprise a username and password that are easily remembered by the user 102a-d. The user password data is received by the receiver 204 of the SSO 100.

The password data determiner 214 determines 502, 504, 506 account password data based on the received user password data. Determining the account password data may comprise the password data determiner 214 controlling the transmitter 202 to transmit 502 a request for account password data to the replica authentication server 406. The replica authentication server 406 then retrieves 504 the account password data from a memory and transmits 506 the retrieved account password data to the SSO 100. If the replica authentication server 406 is stored in a memory of the SSO 100 then the steps of transmitting 502 the request and transmitting 506 the retrieved account password data may not be necessary.

The password determiner 214 controls the transmitter 202 of the SSO 100 to transmit 508 the retrieved account password data to a device 104a in the computer network 108.

The device 104a receives the account password data at the receiver 304 and the authentication controller 214 controls the transmitter 304 to transmit 510 the account password data to the authentication server 106.

The account password data is received and authenticated by the authentication server 106. In the example given in FIG. 5, the authentication server 106 is configured to change the account password data associated with the privileged account that the user 102a-d is trying to access. As such, the authentication server 106 grants 512 access to the privileged account based on the account password data transmitted by the device 104a and requests a change to the account password data.

The authentication server 106 transmits 514 the request to change the account password data to the device 104a. The authentication server 106 may also notify the device 104a that the user 102a-d is to be granted access to the privileged account and afforded all the rights and privileges associated with that account once the account password has been changed.

The device 104a transmits 516 the request to change the account password data to the SSO 100. The device 104a may also notify the SSO that the user 102a-d has been granted access to the privileged account, once the account password has been changed.

The password manager 216 of the SSO 100 changes 518 the account password and controls the transmitter 202 to transmit 520 the updated account password data to the replica authentication server 406. The replica authentication server 406 stores 522 the updated account password data, such that it is associated with one or more privileged accounts. In exemplary methods and apparatus in which the replica authentication server 406 is located at the SSO, the step of transmitting the updated account password data to the replica authentication server occurs internally to the SSO 100 and no external transmission will not be necessary.

After the account password has been changed, the password manager 216 controls the transmitter to transmit 524 the changed account password data to the device 104a, which forwards 526 it to the authentication server 106.

The user is permitted access 528 to the device 104a and the other devices associated with the privileged account.

Because the updated account password data is stored at the replica authentication server 406, the next time a user 102a-d transmits user password data to the SSO 100 to gain access to the privileged account, the SSO 100 can retrieve the correct account password data, in particular, if a user 102a-d attempts to log in to the privileged account via a different device 104b.

In such an example, a the user 102a-d transmits 530 user password data to the SSO 100 to gain access to the account. The password data determiner 214 determines the correct account password data based on the received user password data. Determining the account password data may comprise the password data determiner 214 controlling the transmitter 202 to transmit 532 a request for account password data to the replica authentication server 406. The replica authentication server 406 retrieves 534 the updated account password data from a memory and transmits 536 the retrieved updated account password data to the SSO 100.

The SSO 100 then transmits 538 the updated account password data to the device 104b, which transmits 540 the updated account password data to the authentication server 106, which grants 542 access for the user 102a-d to the privileged account. In this way, access to the privileged account is provided to the user 102a-d, even though access was requested via a second device 104b that has not been part of the previous account password change.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. An apparatus for providing controlled access to a plurality of devices in a computer network, wherein the plurality of devices are accessible by users external to the computer network via the apparatus, which logs into a privileged account, and wherein access to the privileged account is controlled by an authentication server, the apparatus comprising:
at least one hardware processor;
a receiver configured to receive user password data
from a user requesting access to the privileged account via a device of the plurality of devices in the computer network;
a password determiner configured to determine account password data based on the user password data, and configured to control a transmitter to transmit the account password data to the device,
wherein,
the account password data is for allowing the user to access to the privileged account,
the apparatus is a single sign on apparatus configured such that the account password data is not known to the user, and the receiver is further configured to receive a request to update the account password data from the authentication server via the device, the apparatus further comprising a password manager configured to update the account password data and store the updated account password data in a replica authentication server located at the apparatus such that it is associated with the privileged account, wherein the replica authentication server comprises account password data for one or more privileged accounts.

2. An apparatus according to claim 1, wherein the receiver is configured to receive user password data a further time after the account password data has been changed, from a user requesting access to the privileged account, and wherein the password determiner is configured to determine the updated account password data and to control the transmitter to transmit the account password data to one of the plurality of devices.

3. An apparatus according to claim 2, wherein the user requests access to the privileged account via a second device of the plurality of devices in the computer network.

4. An apparatus according to claim 2, wherein the password determiner is configured to determine the updated account password data by retrieving the stored updated account password data.

5. An apparatus according to claim 4, wherein the password determiner is configured to control the transmitter to transmit a request for the updated account password data to the replica authentication server, and wherein the receiver is configured to receive the updated account password data from the replica authentication server.

6. An apparatus according to claim 1, wherein the password manager is configured to control the transmitter to transmit the updated account password data to the replica authentication server.

7. A method for providing controlled access to a plurality of devices in a computer network, wherein the plurality of devices are accessible by users external to the computer network via an apparatus which logs into a privileged account, and wherein access to the privileged account is controlled by an authentication server, the method comprising:

receiving, by a receiver of the apparatus, user password data from a user requesting access to the privileged account via a device of the plurality of devices in the computer network;

determining, by a password determiner of the apparatus, account password data based on the user password data;

controlling, by the password determiner, a transmitter to transmit the account password data to the device, wherein the account password data is for allowing the user to access to the privileged account;

receiving, by the receiver, a request to update the account password data from the authentication server via the device;

updating, by a password manager of the apparatus, the account password data; and storing, by the password manager, the updated account access password data in a replica authentication server located at the apparatus such that it is associated with the privileged account, wherein the replica authentication server comprises password data for one or more privileged accounts;

wherein the apparatus is a single sign on apparatus configured such that the account password data is not known to the user.

8. A method according to claim 7, further comprising the receiver receiving user password data a further time after the account password data has been charged from a user requesting access to the privileged account;

the password determiner determining the updated account password data; and the password determiner controlling the transmitter to transmit the account password data to one of the plurality of devices.

9. A method according to claim 8, wherein the user requests access to the privileged account via a second device of the plurality of devices in the computer network.

10. A method according to claim 8, wherein the password determiner determines the updated account password data by retrieving the stored updated account password data.

11. A method according to claim 7, wherein the password manager controls the transmitter to transmit the updated account password data to the replica authentication server.

12. A method according to claim 7, wherein the password determiner controls the transmitter to transmit a request for the updated account password data to the replica authentication server, and wherein the receiver is configured to receive the updated account password data from the replica authentication server.

13. A computer program embodied in a non-transitory computer-readable storage medium having computer instructions stored thereon when executed on at least one hardware processor, cause the at least one hardware processor to carry out a method for providing controlled access to a plurality of devices in a computer network, wherein the plurality of devices are accessible by users external to the computer network via an apparatus which logs into a privileged account, and wherein access to the privileged account is controlled by an authentication server, the method comprising:

receiving, by a receiver of the apparatus, user password data from a user requesting access to the privileged account via a device of the plurality of devices in the computer network;

determining, by a password determiner of the apparatus, account password data based on the user password data;

controlling, by the password determiner, a transmitter to transmit the account password data to the device, wherein the account password data is for allowing the user to access to the privileged account;

receiving, by the receiver, a request to update the account password data from the authentication server via the device;

updating, by a password manager of the apparatus, the account password data; and storing, by the password manager, the updated account access password data in a replica authentication server located at the apparatus such that it is associated with the privileged account, wherein the replica authentication server comprises password data for one or more privileged accounts, wherein the apparatus is a single sign on apparatus configured such that the account password data is not known to the user.

* * * * *